United States Patent

[11] 3,547,248

| [72] | Inventor | Samuel A. Mencacci<br>Wilrijk, Belgium |
|---|---|---|
| [21] | Appl. No. | 719,095 |
| [22] | Filed | April 5, 1968 |
| [45] | Patented | Dec. 15, 1970 |
| [73] | Assignee | International Machinery Corporation S. A.<br>Sint-Niklaas-Waas, Belgium |
| [32] | Priority | Jan. 18, 1968 |
| [33] | | Belgium |
| [31] | | No. 47,608 |

[54] FEED AND DISCHARGE FOR HYDROSTATIC COOKER CONVEYORS
4 Claims, 7 Drawing Figs.

[52] U.S. Cl. .................................................. 198/24, 198/22
[51] Int. Cl. .................................................. B65g 47/06, B65g 47/82
[50] Field of Search .......................................... 198/179, 153, 46, 50, 24, 22, 188

[56] References Cited
UNITED STATES PATENTS

| 2,561,404 | 7/1951 | Nordquist .................. | 198/22 |
| 3,072,239 | 1/1963 | Jones et al. ................ | 198/24 |

*Primary Examiner*—Richard E. Aegerter
*Assistant Examiner*—Roger S. Gaither
*Attorney*—Richards & Geier ABSTRACT: A feed and discharge device for hydrostatic cooker conveyors, of the type constituted by pivotally linked carriers forming several compartments, accessible by flexing said conveyor according to the given radius, wherein can or jar sticks are individually transferred from a guide in a direction perpendicular to the axis of said stick into a compartment of said conveyor by a pusher bar, constantly rotating around an axis parallel to the stick to be fed into said conveyor.

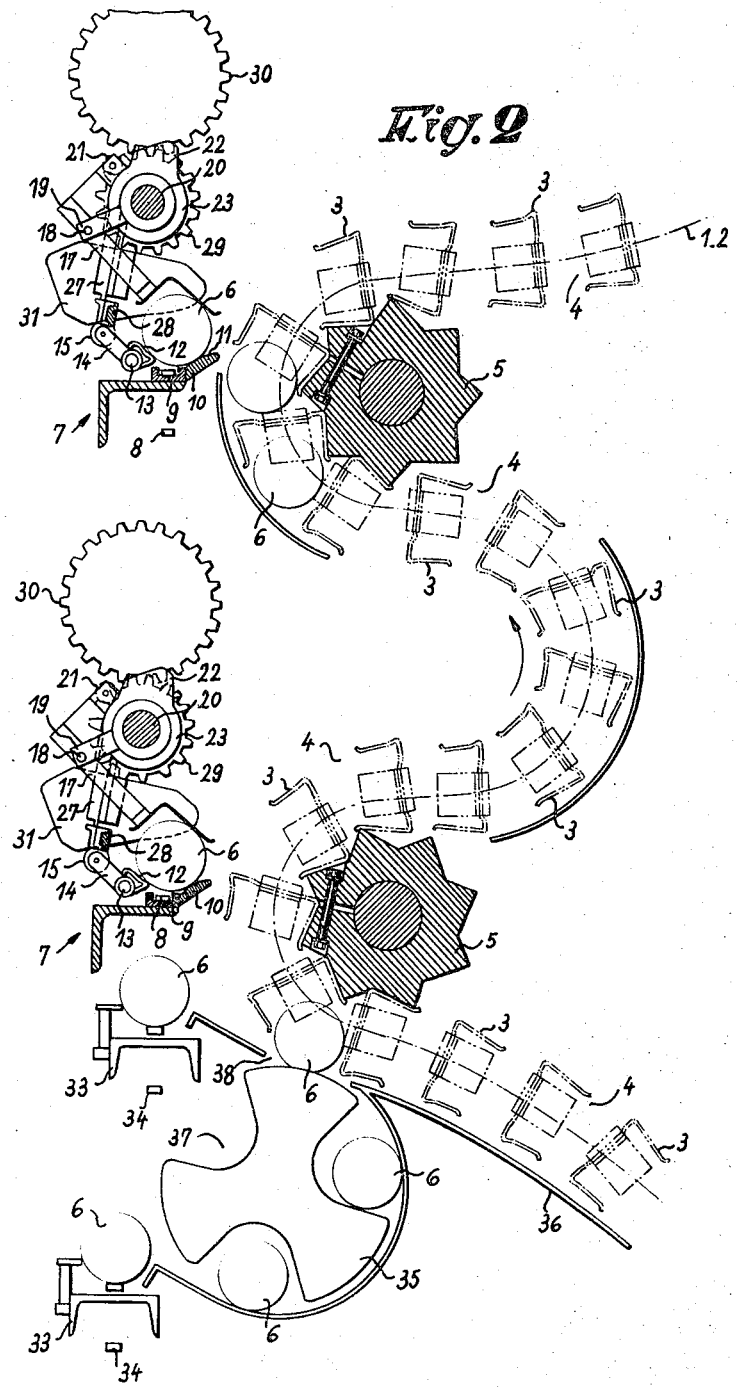

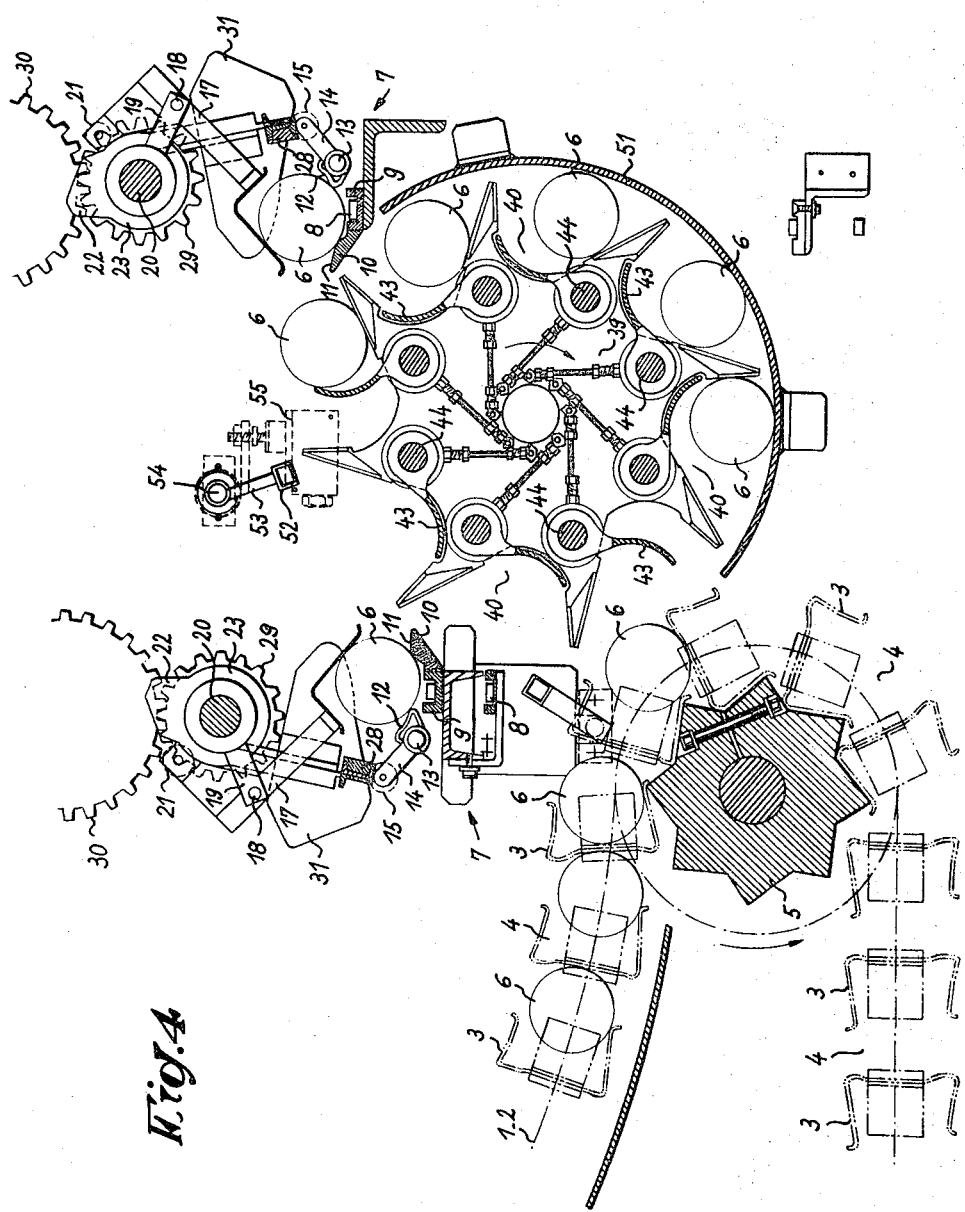

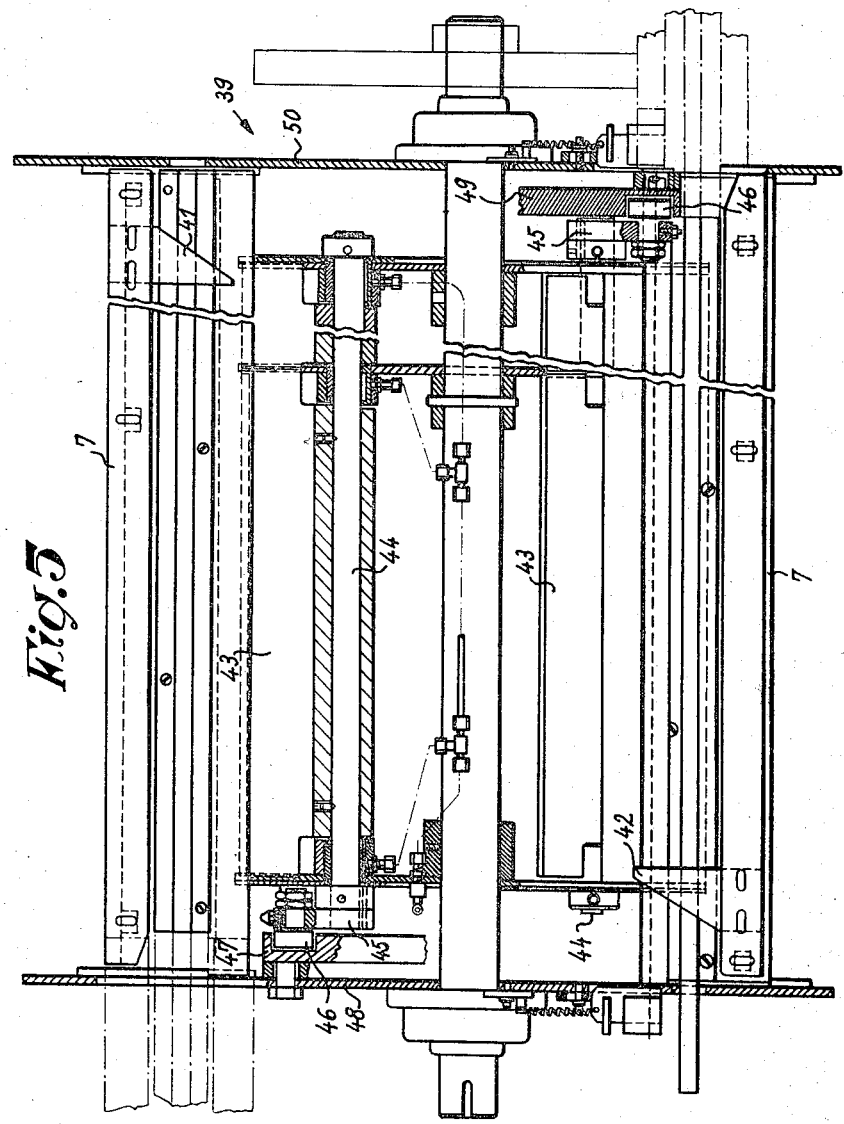

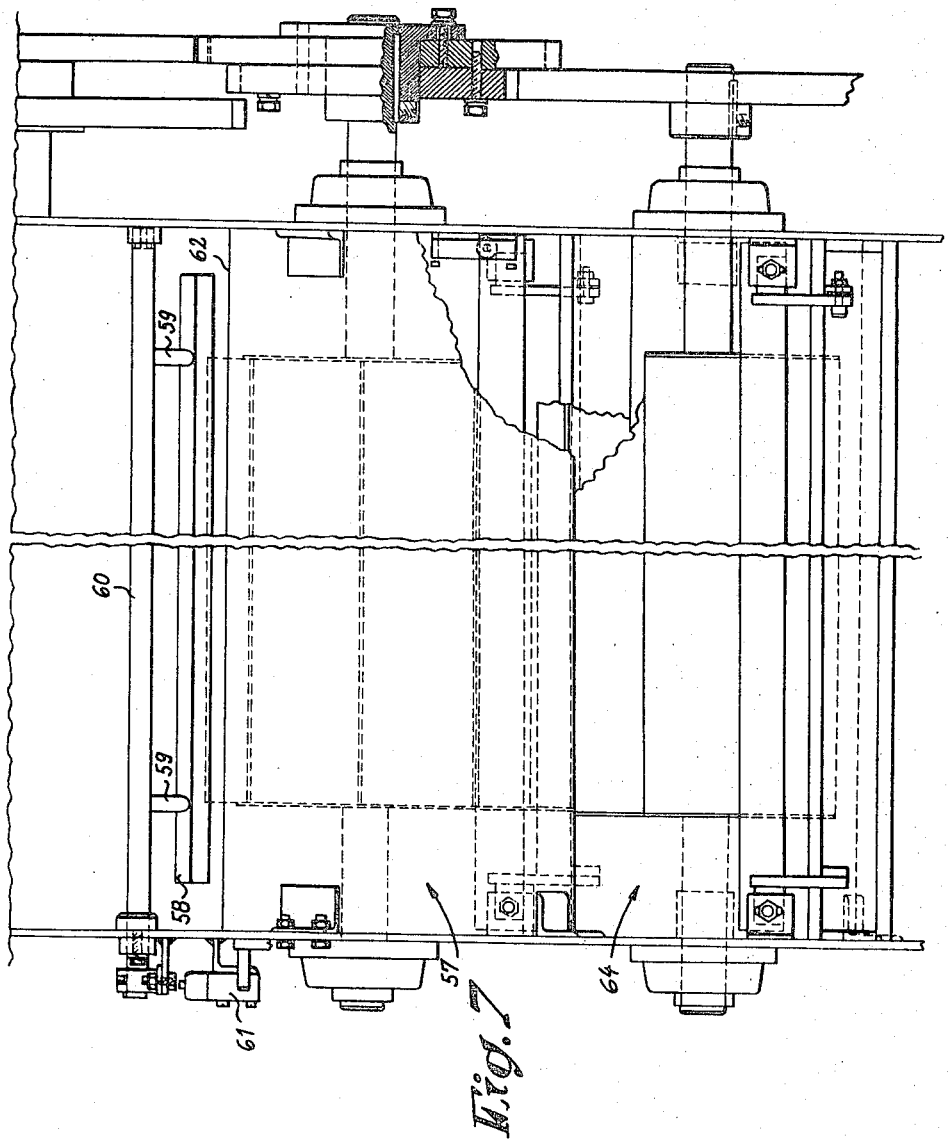

FEED AND DISCHARGE FOR HYDROSTATIC COOKER CONVEYORS

The present invention relates to a feed and discharge device for hydrostatic cooker conveyors and the like and more particularly for conveyors having pivotally linked carriers forming a succession of compartments, accessible, by flexing said conveyor according to a given radius.

One object of the present invention is to provide a loading and discharge device for such types of conveyors which allows to load and discharge said conveyor as the latter is displaced at constant processing speed.

Another object is to provide a loading and discharge device which will make possible the simultaneous processing of two or more types of cans or jars differing as to their contents and/or dimensions, and this with one conveyor only, without any mixup of cans or jars of different type.

These objects are attained, according to the invention, by means of a device including, in its simplest form, on the one hand, a can stick guide located near a conveyor flexing and supporting member and extending parallel to the axis thereof, a rotating stick pusher bar constantly driven in synchronism with the movement of said conveyor, said pusher transferring, per rotation, one stick of cans into said conveyor and, on the other hand, one discharge device located under said conveyor supporting and flexing member.

According to one characteristic feature of the present invention, said can stick guide and rotating pusher bar are equipped with can controlling elements to check the cans prior to and during their transfer, so that the axis of said cans always remains parallel to said guide thereby preventing any possibility of jamming.

According to another characteristic feature of the invention, two such can stick feeding devices may be provided, the conveyor being then equipped with one or two discharge stations. In the second instance, said two discharge stations will preferably be alternately fed by said conveyor through a rotating pocket cylinder.

Other characteristics and advantages of the invention will better appear from the description of typical embodiments of the invention given hereafter by way of example only, reference being made to the schematic appended drawings, wherein:

FIG. 2 is a view similar to that of FIG. 1, showing a twin feed and twin discharge embodiment;

FIG. 3 is a more detailed side elevation, on larger scale, of the transfer unit shown in FIGS. 1 and 2;

FIG. 4 is a side elevation of another double loading station embodiment of this invention;

FIG. 6 is a side elevation of another embodiment of the double discharge station and FIG. 7 is a top view, partly cut away, of the pocket cylinder neighboring parts shown in FIG. 6.

Figure 1:
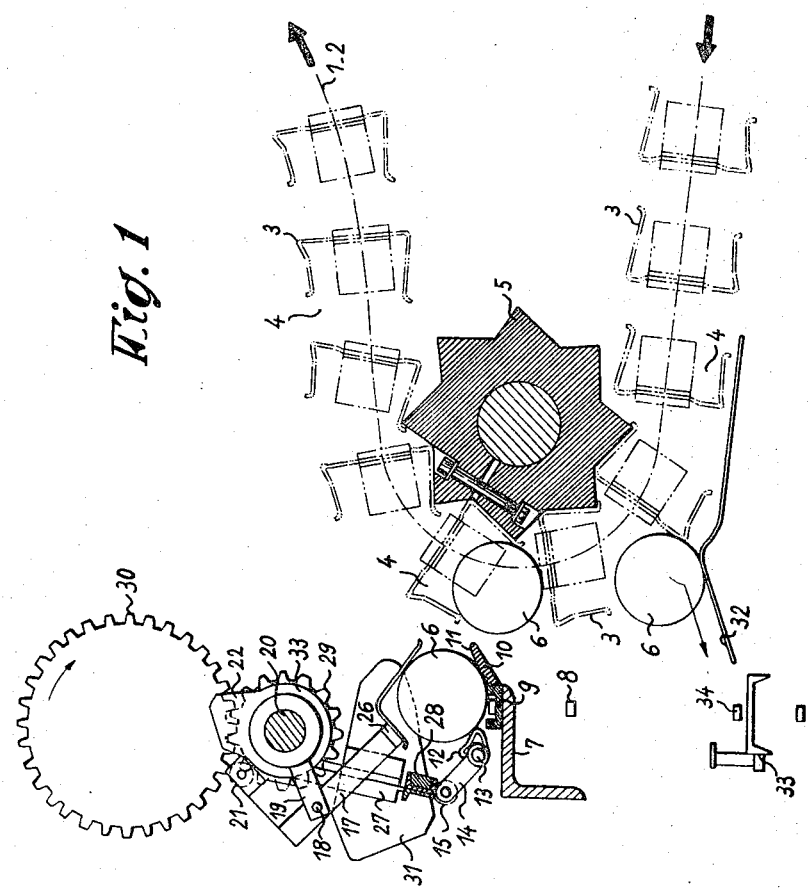
FIG. 1 is a side elevation of a single feed station device according to the invention.
Figure 5:
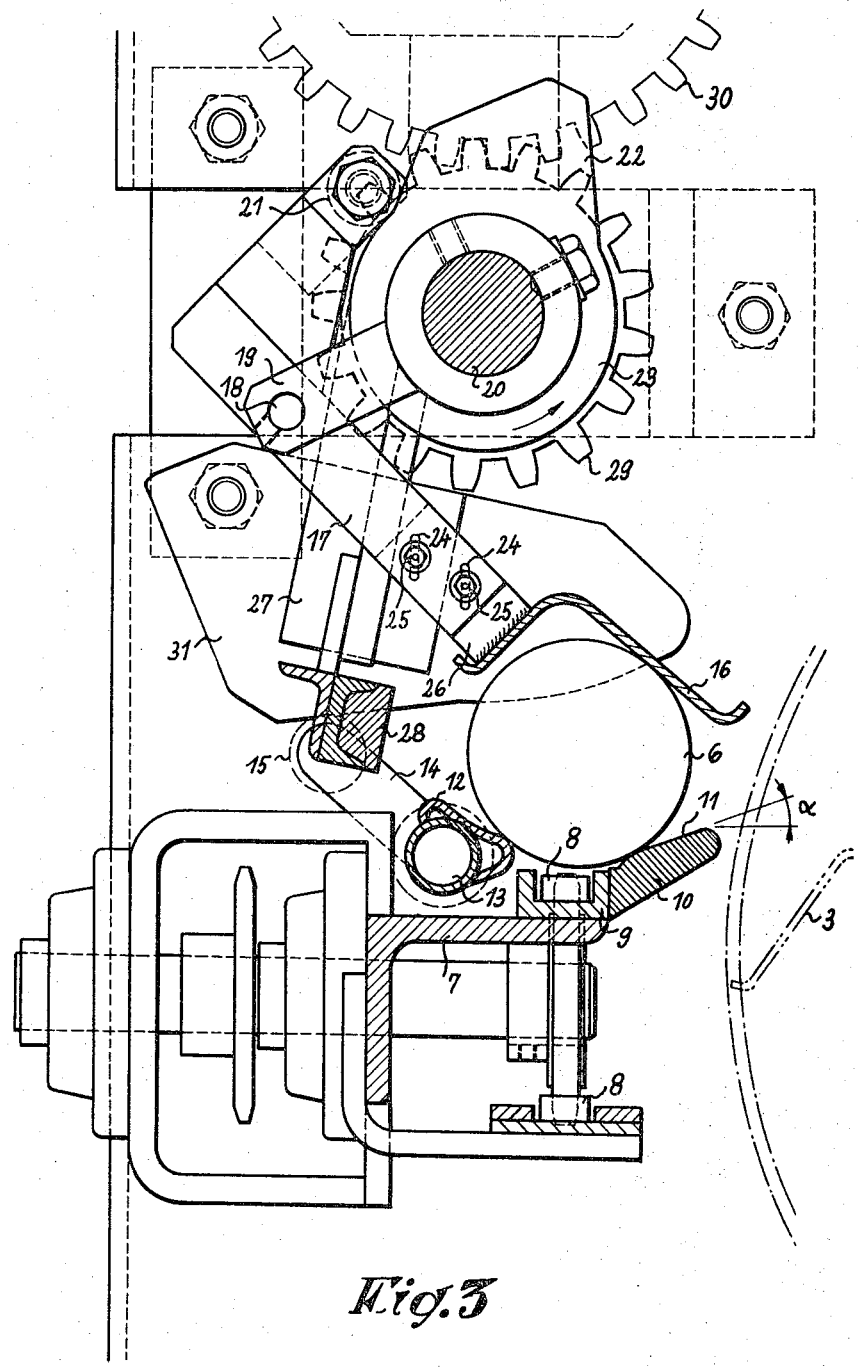
FIG. 5 is a top view, partly cut away, of the pocket cylinder and neighboring parts shown in FIG. 4.

As shown in the drawings, the conveyor is constituted by two parallel endless chains 1.2 on which carrier elements 3 are pivotally fixed. The shape and pivot points of these elements are so chosen that two consecutive elements 3 limit a compartment 4 for one stick of cans or jars, the access to said compartments to insert or withdraw the cans being obtained by flexing the conveyor over a given radius.

Thus, at the loading station shown in FIG. 1, the conveyor is flexed around a backup star wheel 5.

Rows of cans 6 are fed from any suitable stick former or formers onto a supporting guide 7, by means of an endless chain 8. The guide 7 is provided with a U-shaped profile 9 onto which runs the upper leg of said endless chain 8. Towards the conveyor, this profile is equipped with a longitudinal lip 10, the upper surface 11 of which forming an angle $\alpha$ with the horizontal, preferably comprised between 1° and 5°, the purpose of which will be described hereinafter.

The cans 6 arriving on guide 7 are also checked by a longitudinally extending guide rod 12 pivotally mounted on shafts 13 and equipped with radial arms 14, the free ends of which are provided with rollers 15. The cans 6 are further checked by an upper guide plate 16 fixed to one extremity of levers 17 each fulcrumed at 18 on one extremity of a lever 19 rigidly connected to a fixed shaft 20. The other extremity of said levers 17 carries rollers 21 each in permanent contact with a cam 22 fixed to a sleeve 23 provided around shaft 20.

The minimum distance between said guide plate 16 and guide 7 may be adjusted as shown in FIG. 3, by means of longitudinal slots 24 in said lever 17 cooperating with nuts and bolts 25, the latter traversing connecting plates 26 fixed to said guide plate 16.

Levers 27 are fixed, at one of their extremities, to said sleeves 23 and support a longitudinally extending pusher bar 28.

A constant circular motion of said bar 28 around shaft 20 is imparted by a gear wheel 29, fixed to one of said sleeves 23, said gear meshing with a toothed wheel 30 driven from the conveyor driving means (not shown). Each of the levers 27 carries a cam plate 31, the edge of which acts on said rollers 15. The profile of this cam is such that during the rotation of the pusher assembly 27—28 around shaft 20 and prior to the engagement of cans 6 by said pusher bar 28, the lever 14 is angularly displaced downwardly so that said guide rod 12 rotates to lift the cans 6 off of chain 8 and onto said upper surface 11 of lip 10. In the meantime, the rotation of cam 22 starts to lift rollers 21 and, subsequently, said guide plate 16. During the subsequent transfer stroke of the pusher bar 28, said guide plate is further lifted to free the way to cans 6, into a pocket 4 of said conveyor. Upon further rotation of the pusher assembly, the guide rod 12 and guide plate 16 return to their initial position, so that a new stick of cans may be fed onto guide 7.

In the embodiment shown in FIG. 1, the discharge station is constituted by a single incline 32 leading to a can guide 33 provided with an endless chain 34.

When two feeding stations are provided, as shown in FIG. 2, the unloading station may advantageously comprise two separate guides 33 alternately feed by means of a three-pocket cylinder 35 cooperating with a slotted guide wall 36. This cylinder is driven at such a speed that one of its pockets 37 passes under slot 38 of said wall 36 to receive one out of two sticks displaced by said conveyor and transfer these to the lower guide 33, the other sticks being pushed onto the upper guide. It is thus possible to process two different sizes of cans while keeping these two sizes constantly separated. In the embodiment shown in FIG. 4, one backup star wheel 5 only is used in conjunction with two feeding stations. The latter are feed by a cylinder 39 provided with a plurality of peripheral pockets 40, the length of which is slightly greater than that of the sticks of cans.

The guides 7 are provided with abutments 41 and 42 respectively to hold the can sticks in register with said cylinder 39.

Each pocket 40 is equipped with a paddle 43 mounted around a shaft 44 which is pivotally supported within said cylinder 39. A lever 45 is mounted on one extremity of each shaft 44, said lever carrying a roller 46. The rollers of the odd numbered levers are engaged within a cam track 47 rigidly connected to a supporting plate 48, at one end of cylinder 39, while the rollers of the even numbered levers are similarly engaged within a cam track 49, connected to a supporting plate 50 at the other end of said cylinder;

The rows of cans located on said guides 7 are individually transferred within pockets 12 by means of the above described pusher bars.

As each odd numbered pocket 12 approaches the right-hand guideway 7 as seen in FIG. 4, the cam track 47 forces the corresponding paddle 43 to rise from the bottom of the pocket towards the stick of cans pushed by pusher 28 and, subsequently, to gently lower said stick into said pocket, thereby preventing any damage to the cans or jars.

Similarly, the paddles 43 of the even numbered pockets assist the transfer of cans from the left-hand guideway 7.

The sticks thus transferred into the continuously rotating pocket wheel 39 are checked by a guide plate 51 up to the actual loading point into conveyor 1.2, where the latter is flexed by and around above-mentioned backup wheel 5. At this point, paddles 43 are successively actuated so as to push the sticks out of the pockets 40 and into an open compartment 4.

To detect any eventual misalignment of cans or jars transferred by the left-hand pusher bar, a feeler bar 52 is swingingly supported through levers 53, by shaft 54, any angular displacement of said feeler bar 52 actuating a microswitch 55 to stop the entire feeding device.

The cans or jars thus loaded into the conveyor 1.2 are carried away by the latter for processing in the hydrostatic cooker.

At the outlet side of said cooker, the conveyor 1.2 is again flexed by means of a wheel 5 whereby the sticks of processed cans or jars are successively transferred, by gravity, into pockets 56 of a pocket cylinder 57. An eventual incorrect positioning of the cans or jars within pockets 56 can be detected by a feeler bar 58, swingingly suspended by arms 59 to a shaft 60 and controlling a microswitch 61 the closing of which stops the entire conveyor system.

Figure 6:
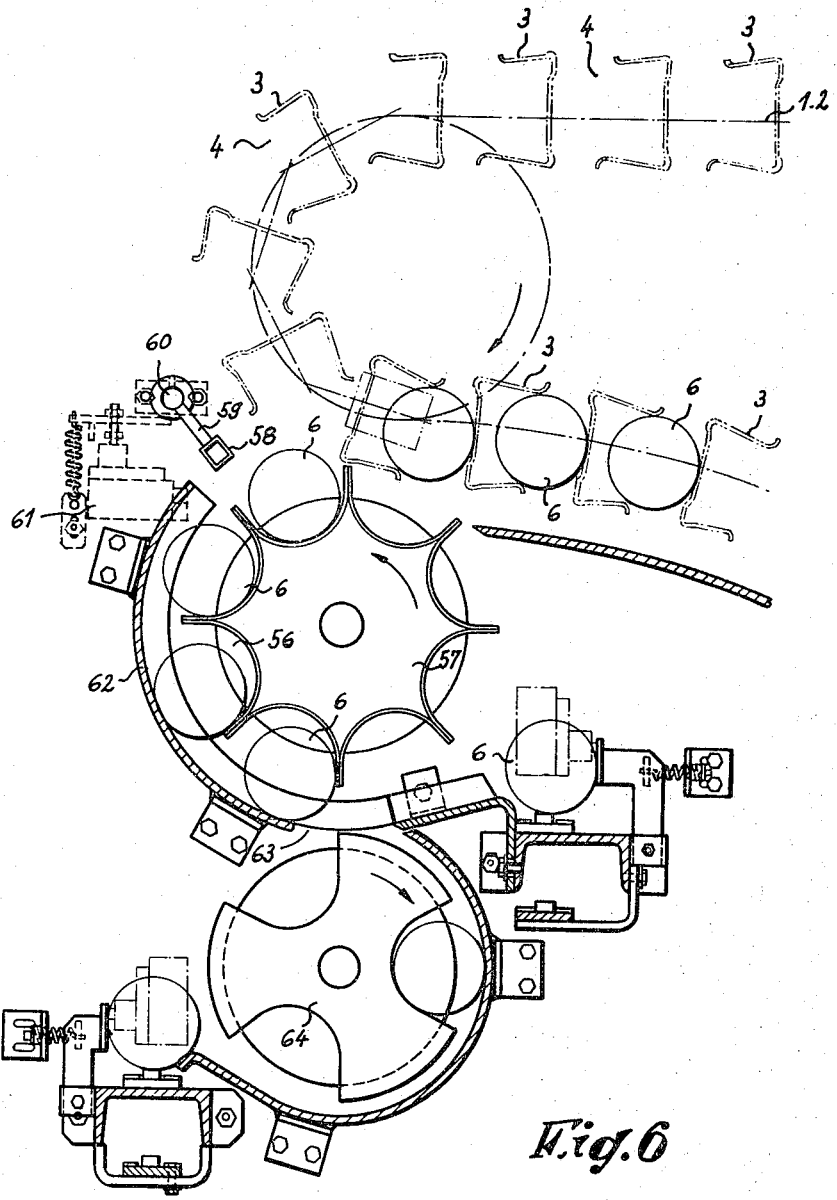

The pocket cylinder 57 is driven in a counterclockwise direction as viewed in FIG. 6, the sticks contained in said pockets being prevented from escaping by a cylindrical guide wall 62. At the lower part thereof, a longitudinal slot 63 is provided, the width of which being substantially equal to the greatest width of each pocket 56. A three-pocketed cylinder 64 is rotatably mounted underneath said slot 63 and is driven at the same angular speed as cylinder 57.

This arrangement also allows to feed a conveyor with sticks of cans or jars formed on relatively slow working stick formers without having to slow the conveyor down or to impart a step-by-step motion thereto.

I claim:

1. In combination with a cooker conveyor and a plurality of carriers pivotably linked to said conveyor and defining a series of compartments therebetween, driving means adapted to flex said conveyor about a predetermined radius to render said compartments accessible, and a feed device comprising guide means adapted to receive periodically sticks of cans, and driven transfer means adapted to laterally push said sticks from said guide means and into said compartment, said guide means comprising a static supporting member, an oscillating supporting member and an oscillating checking member, said members controlling each can of a stick along at least three generatrices thereof.

2. A feed device in accordance with claim 1, comprising means driving said oscillating supporting member and said oscillating checking member in synchronism with said driven transfer means.

3. A feed device in accordance with claim 2, wherein said driven transfer means comprise a pusher bar, a plurality of interconnected levers, said pusher bar being fixed to one end of said levers, a shaft, sleeves rotatably mounted upon said shaft and fixed to the other end of said levers, a toothed gear integral with at least one of said sleeves, a toothed wheel meshing with said toothed gear, said toothed wheel being connected with and continuously driven by said driving means, a cam carried by one of said sleeves and actuating said oscillating checking member and a cam carried by one of said levers and actuating said oscillating supporting member.

4. A feed device in accordance with claim 1, wherein said static supporting member has a cam supporting surface sloping upwardly towards the conveyor at an angle ranging between 1° and 5° with reference to the horizontal plane.